(12) United States Patent
Yokochi et al.

(10) Patent No.: US 10,210,405 B2
(45) Date of Patent: Feb. 19, 2019

(54) SIGN INFORMATION DISPLAY SYSTEM AND METHOD

(71) Applicant: Honda Motor Co., Ltd., Tokyo (JP)

(72) Inventors: Yuji Yokochi, Wako (JP); Izumi Takatsudo, Wako (JP); Shinnosuke Saito, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 83 days.

(21) Appl. No.: 15/388,174

(22) Filed: Dec. 22, 2016

(65) Prior Publication Data

US 2017/0177957 A1    Jun. 22, 2017

(30) Foreign Application Priority Data

Dec. 22, 2015    (JP) .................................. 2015-249321

(51) Int. Cl.
*H04N 7/18* (2006.01)
*G06F 7/70* (2006.01)
(Continued)

(52) U.S. Cl.
CPC .......... *G06K 9/00818* (2013.01); *B60K 35/00* (2013.01); *B60K 37/02* (2013.01); *G06K 9/00798* (2013.01); *G06K 9/03* (2013.01); *G06K 9/6293* (2013.01); *G09F 19/18* (2013.01); *G09F 21/04* (2013.01); *G09G 5/006* (2013.01); *H04N 5/23293* (2013.01); *H04N 5/77* (2013.01); *B60K 2350/106* (2013.01); *B60K 2350/1064* (2013.01); *B60K 2350/1068* (2013.01); *B60K 2350/1096* (2013.01); *B60K 2350/2052* (2013.01); *B60K 2350/352* (2013.01); *B60K 2350/357* (2013.01); *B60K 2350/965* (2013.01); *G09G 2380/10* (2013.01)

(58) Field of Classification Search
CPC ......... G08G 1/096783; G08G 1/09623; G06K 9/00818
See application file for complete search history.

(56) References Cited

U.S. PATENT DOCUMENTS 8,669,857 B2    3/2014    Sun et al.
9,164,511 B1 *  10/2015   Ferguson ............. G05D 1/0231
(Continued)

FOREIGN PATENT DOCUMENTS

JP    2000-222681 A    8/2000
JP    2005-128790 A    5/2005
(Continued)

OTHER PUBLICATIONS

Office Action dated Sep. 5, 2017, issued in counterpart Japanese Application No. 2015-249321, with English machine translation. (8 pages).

*Primary Examiner* — Rebecca A Volentine

(74) *Attorney, Agent, or Firm* — Westerman, Hattori, Daniels & Adrian, LLP

(57) ABSTRACT

If a first sign information detector 62 is normal, a first display 94 displays sign information detected by the first sign information detector 62, in accordance with an instruction from a control circuit 70. At this time, a second display 64 hides sign information in accordance with an instruction from the control circuit 70. On the other hand, if the first sign information detector 62 is abnormal, the first display 94 hides the sign information in accordance with an instruction from the control circuit 70. At this time, the second display 64 displays sign information detected by the second sign information detector 64, in accordance with an instruction from the control circuit 70.

6 Claims, 10 Drawing Sheets

(51) Int. Cl.

| | |
|---|---|
| *G06F 19/00* | (2018.01) |
| *G06G 7/00* | (2006.01) |
| *G06G 7/76* | (2006.01) |
| *G06K 9/00* | (2006.01) |
| *G09F 19/18* | (2006.01) |
| *G09F 21/04* | (2006.01) |
| *B60K 35/00* | (2006.01) |
| *H04N 5/232* | (2006.01) |
| *G09G 5/00* | (2006.01) |
| *B60K 37/02* | (2006.01) |
| *H04N 5/77* | (2006.01) |
| *G06K 9/03* | (2006.01) |
| *G06K 9/62* | (2006.01) |

(56) References Cited

U.S. PATENT DOCUMENTS

| | | | |
|---|---|---|---|
| 2005/0278113 A1* | 12/2005 | Maruyama | G01C 21/36 701/436 |
| 2007/0194950 A1* | 8/2007 | Boss | G08G 1/0962 340/905 |
| 2009/0074249 A1* | 3/2009 | Moed | G06K 9/00818 382/104 |
| 2011/0169626 A1 | 7/2011 | Sun et al. | |
| 2013/0010118 A1* | 1/2013 | Miyoshi | B60R 1/00 348/148 |
| 2013/0211682 A1* | 8/2013 | Joshi | G08G 1/0967 701/70 |
| 2014/0300741 A1* | 10/2014 | Wey | G08G 1/09623 348/148 |
| 2016/0117922 A1* | 4/2016 | Oh | G08G 1/09623 348/118 |
| 2016/0117923 A1* | 4/2016 | Dannenbring | G01C 21/32 340/905 |
| 2016/0360193 A1* | 12/2016 | Hwang | H04N 17/002 |
| 2017/0010117 A1* | 1/2017 | Oh | G01C 21/3492 |
| 2017/0144545 A1* | 5/2017 | Yanatsubo | B60K 35/00 |

FOREIGN PATENT DOCUMENTS

| | | |
|---|---|---|
| JP | 2015-134521 A | 7/2015 |
| WO | 2015/133070 A1 | 9/2015 |

* cited by examiner

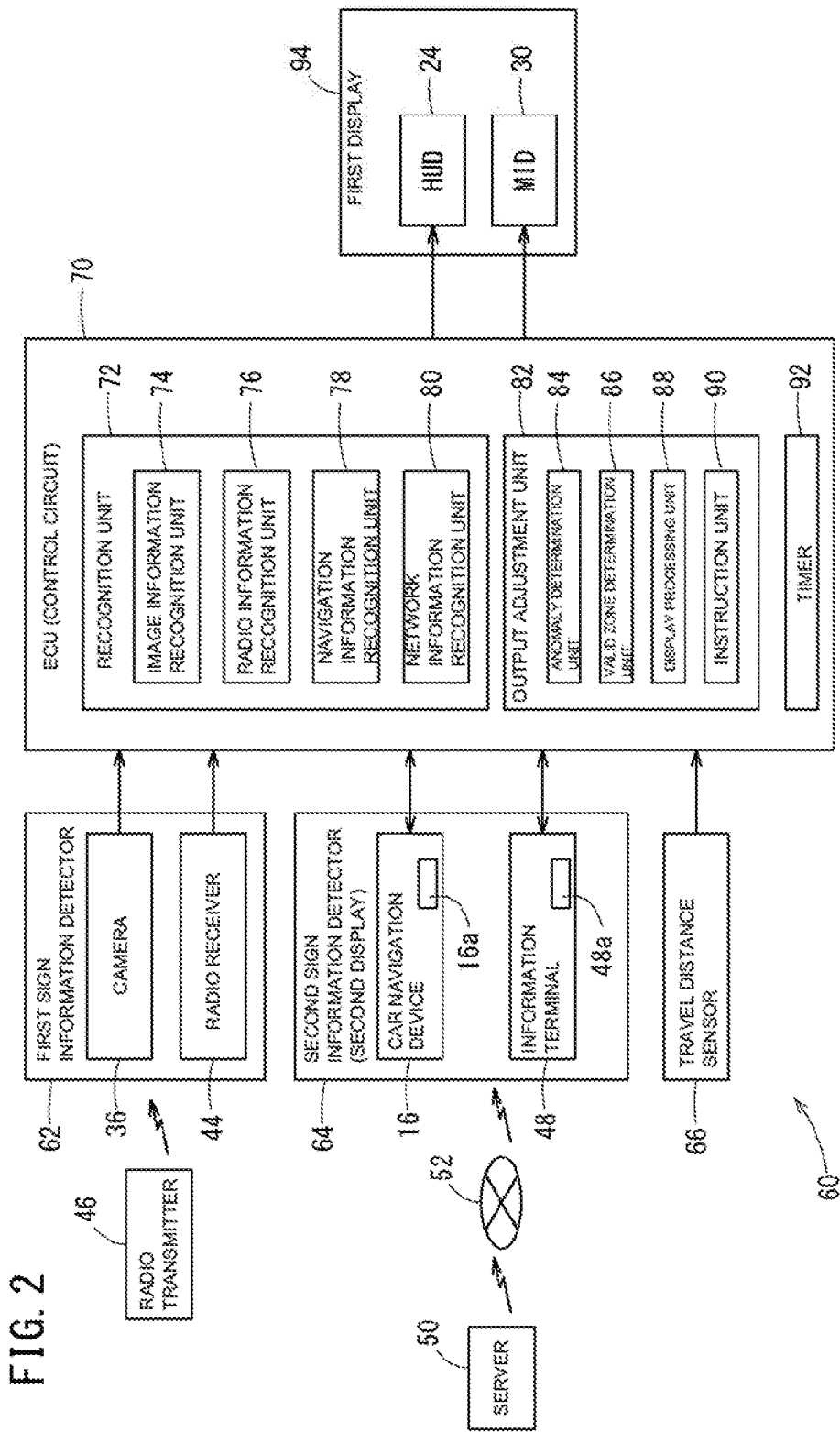

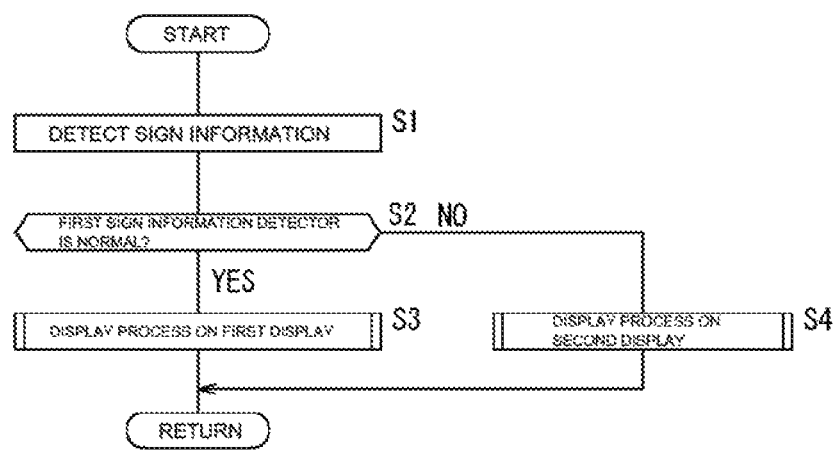

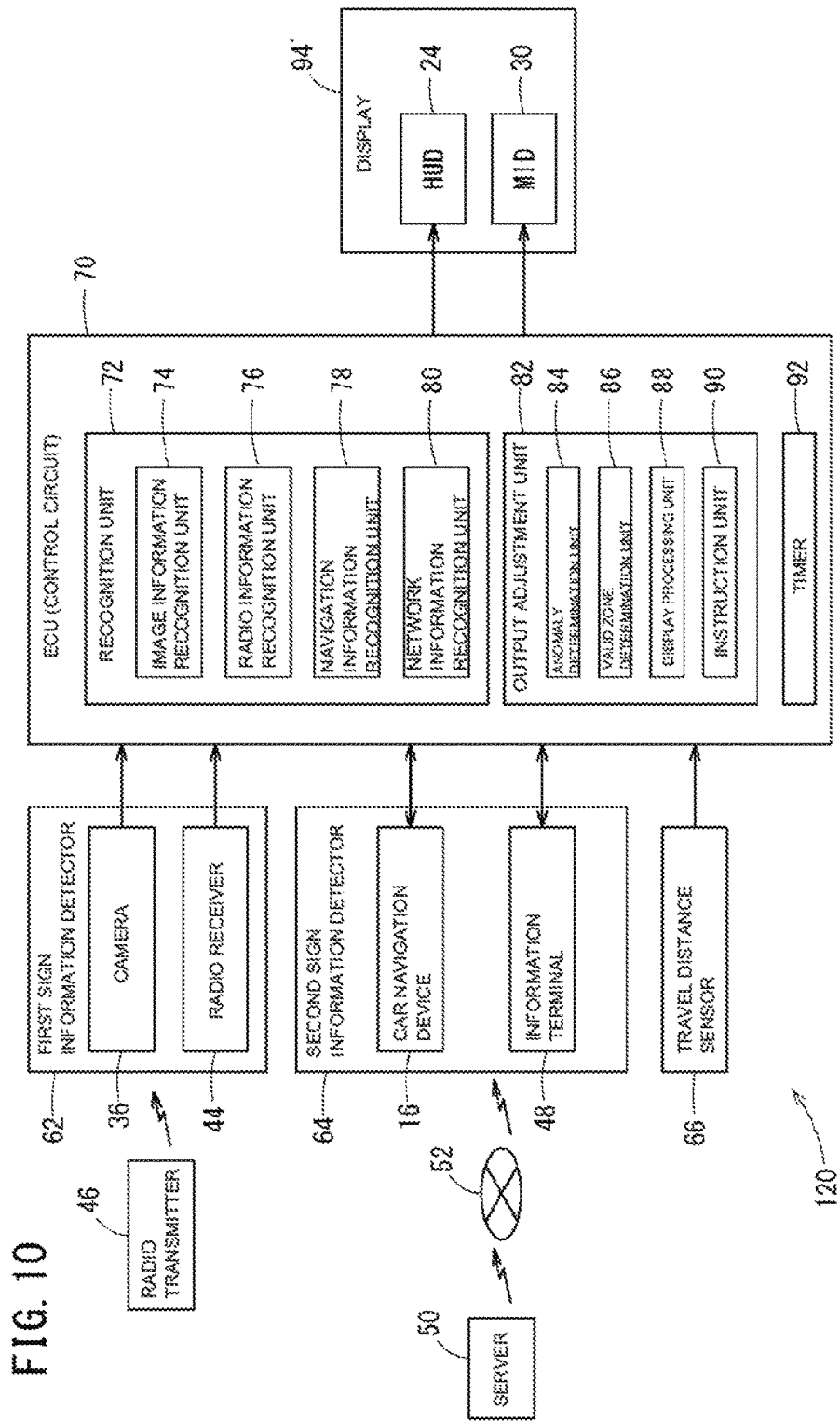

SIGN INFORMATION DISPLAY SYSTEM AND METHOD

CROSS-REFERENCE OF RELATED APPLICATION

This application claims priority of Japanese Patent Application No. 2015-249321 filed in Japan on Dec. 22, 2015, the entire contents of which are incorporated herein by reference.

TECHNICAL FIELD

The present invention relates to a vehicle sign information display system and method for displaying sign information on a traffic sign or a road marking on an in-vehicle display.

BACKGROUND OF THE INVENTION

Recent vehicles have a system for displaying sign information on an in-vehicle display. Sign information is detected from a road marking taken by an in-vehicle camera. Further, in some cases, vehicle-roadside communication is performed between a radio transmitter (such as a beacon) installed along a road and an in-vehicle radio receiver. In the case where sign information is transmitted from the radio transmitter, sign information can be detected by receiving this signal at the radio receiver. Besides, sign information can be detected from map information in a system that detects the location of the vehicle it belongs to (such as a car navigation device).

Various documents show the system for displaying sign information on an in-vehicle display. For example, U.S. Pat. No. 8,669,857 shows a system for: detecting maximum speed information, indicated by a traffic sign, based on an image of an area in front of the vehicle taken by an in-vehicle camera or a camera of a mobile terminal; and displaying the maximum speed information or warning information on an in-vehicle display or a display of the mobile terminal (line 40 in column 7 to line 13 in column 8, for example). Japanese Patent Application Publication No. 2005-128790 shows a system for: detecting maximum speed information, indicated by a traffic sign or a road marking, based on an image of an area in front of the vehicle taken by an in-vehicle camera, or detecting maximum speed information from map information stored in a car navigation device; and, if both sets of maximum speed information agree with each other, displaying this maximum speed information on a display and, if both sets of maximum speed information do not agree with each other, displaying any one of the sets of maximum speed information on the display (paragraphs [0015], [0016], and [0029], for example).

In the system of U.S. Pat. No. 8,669,857, if an anomaly occurs in the camera, the system cannot detect sign information and thus cannot display sign information on the display. On the other hand, in the system of Japanese Patent Application Publication No. 2005-128790, even if an anomaly occurs in the camera, the system can detect sign information from the map information stored in the car navigation device, and thus can display the sign information on the display.

Meanwhile, every time the maximum speed information detected by the camera and that detected by the car navigation device do not agree with each other, the system of Japanese Patent Application Publication No. 2005-128790 determines the order of priority of the camera and the car navigation device and displays the maximum speed information of the one having a higher priority. Specifically, if the condition of an image taken by the camera is good, the system displays the maximum speed information detected by the camera in priority to the other; if the condition of the image is poor, the system displays the maximum speed information detected by the car navigation device in priority to the other. However, whether the condition of a camera image is good or poor sometimes changes frequently along with the change in the travel position and with the passage of time. In this case, the system of Japanese Patent Application Publication No. 2005-128790 repeats switching of the display content in a short time interval, which might give a sense of discomfort to the driver.

SUMMARY OF INVENTION

The present invention has been made in consideration of the above problem, and aims to provide a sign information display system and method capable of preventing frequent switching of sign information display content and thereby reducing a sense of discomfort that the driver feels.

A sign information display system according to the present invention includes: a first sign information detector that is configured to detect sign information on a traffic sign or a road marking, which is located in an area in front of a vehicle, from information received from outside the vehicle; a second sign information detector that is configured to detect the sign information from information stored inside the vehicle; a first display that is configured to display thereon the sign information detected by the first sign information detector; a second display that is configured to display thereon the sign information detected by the second sign information detector; and a control circuit that is configured to control the first display and the second display, the system being characterized in that, if the first sign information detector is normal, the first display displays the sign information detected by the first sign information detector, in accordance with an instruction from the control circuit, and the second display hides the sign information in accordance with an instruction from the control circuit, and, if the first sign information detector is abnormal, the first display hides the sign information in accordance with an instruction from the control circuit, and the second display displays the sign information detected by the second sign information detector, in accordance with an instruction from the control circuit.

In the present invention, since the first display displays the sign information detected by the first sign information detector and the second display hides the sign information when the first sign information detector is normal, it is possible to prevent a hunting phenomenon in which display of the sign information detected by the first sign information detector and display of the sign information detected by the second sign information detector are switched from each other in a short period of time, and thereby reduce a sense of discomfort that the driver feels.

In addition, in the present invention, since the first display hides the sign information and the second display displays the sign information detected by the second sign information detector when the first sign information detector is abnormal, it is possible to keep displaying the sign information in the vehicle compartment. Further, since the second display displays the sign information when the first sign information detector is abnormal, the driver can recognize an anomaly/failure of the first sign information detector.

In the present invention, the system may be configured such that the first sign information detector includes at least one of: an imaging and detection device that is configured to take an image of the area in front of the vehicle and detect the sign information; and a communication detector that is configured to receive a signal transmitted from an information transmission device installed outside the vehicle and detect the sign information, and further includes a determination device that is configured to determine whether the first sign information detector is normal or abnormal, and the determination device determines that the first sign information detector is normal if detecting a detection signal that is output from the first sign information detector irrespective of whether there is sign information or not, and determines that the first sign information detector is abnormal if not detecting the detection signal.

In the present invention, since the anomaly determination unit determines that the first sign information detector is normal and causes the second display to hide the sign information detected by the second sign information detector when it detects the detection signal output from the first sign information detector, it is possible to prevent a hunting phenomenon in which display of the sign information detected by the first sign information detector and display of the sign information detected by the second sign information detector are switched from each other in a short period of time, and thereby reduce a sense of discomfort that the driver feels.

In the present invention, the system may be configured such that the first sign information detector or the second sign information detector detects information on a maximum speed of the vehicle on a travel course, and further includes a priority information detector that is configured to detect priority information having a higher priority for display than the maximum speed information, if the maximum speed information is detected by the first sign information detector and the priority information is not detected by the priority information detector, the first display displays the maximum speed information in accordance with an instruction from the control circuit, and the second display hides the maximum speed information in accordance with an instruction from the control circuit, and, if the priority information is detected by the priority information detector, the first display hides the maximum speed information and displays the priority information in accordance with an instruction from the control circuit, and the second display displays the maximum speed information in accordance with an instruction from the control circuit.

In the present invention, since the first display displays the priority information having a higher priority, it is possible to notify the driver of the priority information in a clearly understandable way. At this time, since the second display displays the maximum speed information, it is possible to provide the driver with necessary information.

In the present invention, the system may be configured such that, when switching the mode of the sign information from the display mode to the hidden mode, the first display hides an image, indicating the sign information, after displaying a video such that the image moves toward a location where the second display is disposed.

The present invention allows the driver to easily recognize visually where the sign information is to be displayed next when the first display switches the mode of the sign information from the display mode to the hidden mode. Thereby, a sense of discomfort that the driver feels can be reduced.

In the present invention, the system may be configured such that, when switching the mode of the sign information from the hidden mode to the display mode, the second display displays the image, indicating the sign information, after displaying a video such that the image moves from a location where the first display is disposed.

The first embodiment allows the driver to easily recognize visually that the sign information has shifted from the first display when the second display switches the mode of the sign information from the hidden mode to the display mode. Thereby, a sense of discomfort that the driver feels can be reduced.

A sign information display system according to the present invention includes: a first sign information detector that is configured to detect sign information on a traffic sign or a road marking, which is located in an area in front of a vehicle, from information received from outside the vehicle; a second sign information detector that is configured to detect the sign information from information stored inside the vehicle; a display that is configured to display thereon the sign information; and a control circuit that is configured to control the display, the system being characterized in that, if the first sign information detector is normal, the display displays the sign information detected by the first sign information detector, in accordance with an instruction from the control circuit, and, if the first sign information detector is abnormal, the display displays the sign information detected by the second sign information detector, in accordance with an instruction from the control circuit.

According to the present invention, the display always displays the sign information at the same location irrespective of a change in the source of detection of the sign information. This enables the driver to visually identify the displayed sign more easily.

A sign information display method uses: a first sign information detector that is configured to detect sign information on a traffic signora road marking, which is located in an area in front of a vehicle, from information received from outside the vehicle; a second sign information detector that is configured to detect the sign information from information stored inside the vehicle; a first display that is configured to display thereon the sign information detected by the first sign information detector; and a second display that is configured to display thereon the sign information detected by the second sign information detector, the method including: causing the first display to display the sign information detected by the first sign information detector and causing the second display to hide the sign information if the first sign information detector is normal; and causing the first display to hide the sign information and causing the second display to display the sign information detected by the second sign information detector if the first sign information detector is abnormal.

In the present invention, since the first display displays the sign information detected by the first sign information detector and the second display hides the sign information when the first sign information detector is normal, it is possible to prevent a hunting phenomenon in which display of the sign information detected by the first sign information detector and display of the sign information detected by the second sign information detector are switched from each other in a short period of time, and thereby reduce a sense of discomfort that the driver feels.

In addition, in the present invention, since the first display hides the sign information and the second display displays the sign information detected by the second sign information detector when the first sign information detector is abnormal, it is possible to keep displaying the sign information in the vehicle compartment. Further, since the second display displays the sign information when the first sign information detector is abnormal, the driver can recognize an anomaly/failure of the first sign information detector.

According to the present invention, it is possible to prevent a hunting phenomenon in which display of the sign information detected by the first sign information detector and display of the sign information detected by the second sign information detector are switched from each other in a short period of time, and thereby reduce a sense of discomfort that the driver feels.

BRIEF DESCRIPTION OF THE DRAWINGS

FIG. 2 is a block diagram of a sign information display system according to a first embodiment.

FIG. 3 is a flowchart of the sign information display system according to the first embodiment.

FIG. 10 is a block diagram of a sign information display system according to a third embodiment.

DETAILED DESCRIPTION OF THE INVENTION

Hereinbelow, preferred embodiments of a sign information display system 60 according to the present invention are described in detail with reference to the accompanying drawings.

[1. Interior of Vehicle 10]

Figure 1:
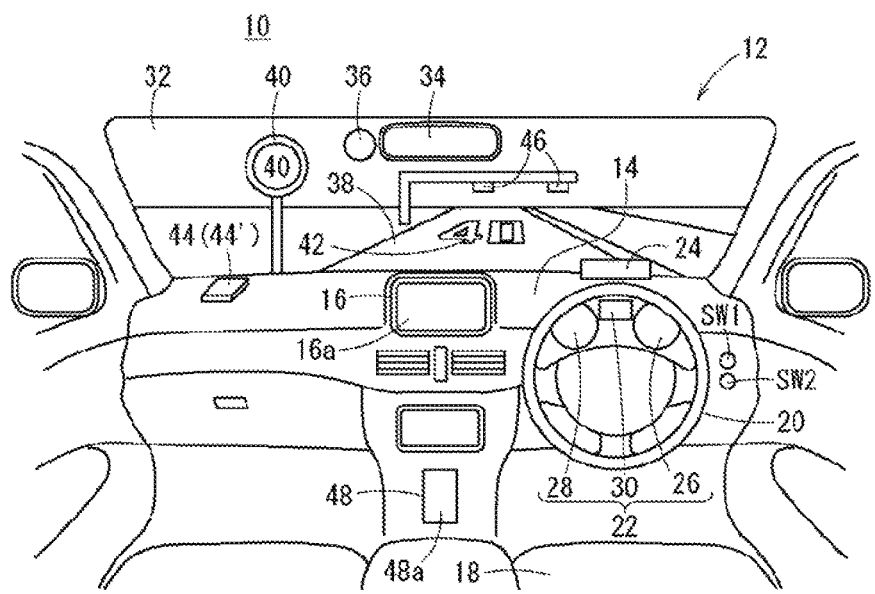
FIG. 1 is a schematic view illustrating the interior of a vehicle in a simplified form.

The sign information display system 60 (see FIG. 2) is incorporated in a vehicle 10. First, the interior of the vehicle 10 is described using FIG. 1. The interior of the vehicle 10 in FIG. 1 is illustrated in a deformed manner for the sake of facilitating explanation. In a vehicle compartment 12 of the vehicle 10, a car navigation device 16 is installed in a substantially central part of a dashboard 14 in a vehicle widthwise direction. A meter panel 22 is placed on the right side of the dashboard 14 in the vehicle widthwise direction and in front of a driver's seat 18 and a steering wheel 20. A head up display (HUD) 24 is placed in front of the meter panel 22.

The car navigation device 16 is a terminal included in the vehicle 10. The car navigation device 16 is configured to load map information from a storage medium (such as a CD or a DVD-ROM) and store the map information in its internal storage device. The car navigation device 16 has a function to measure the travel position of the vehicle 10, and is configured to detect sign information, which is set in association with the travel position of the vehicle 10, from the map information and display it on a screen 16a.

The meter panel 22 has: a speed meter 26 that is disposed on the right side; a tachometer 28 that is disposed on the left side; and a multi information display (MID) 30 that is disposed at the center. The MID 30 is configured to display thereon images indicating various kinds of information such as sign information and vehicle information (vehicle speed, yaw rate, fuel consumption, travel time, travel distance of each kind, cruising-available distance, driving mode, etc.). The display content of the MID 30 is switchable through manipulation of a changeover switch SW1 placed in the vehicle compartment 12.

The HUD 24 includes: a projection unit that is configured to project various images; and a display unit that is configured to display the projected images. The projection unit is embedded in the dashboard 14, and the display unit stands on the dashboard 14. As in the MID 30, the HUD 24 is configured to display thereon images indicating various kinds of information such as sign information and vehicle information (vehicle speed, yaw rate, fuel consumption, travel time, travel distance of each kind, cruising-available distance, driving mode, etc.). The display content of the HUD 24 is switchable through manipulation of a changeover switch SW2 placed in the vehicle compartment 12. In this respect, the HUD 24 includes a type that is placed in a roof, a type that projects images on a windshield 32, and so on, and either type may be used.

A camera 36 is placed on the inner side of the windshield 32 and near a rearview mirror 34. The camera 36 is mounted while facing an area in front of the vehicle 10. Various cameras (monocular camera, stereo camera, infrared camera, etc.) may be used as the camera 36. The camera 36 takes an image of the area in front of the vehicle 10 constantly or for every predetermined period, and at this time also takes an image of a traffic sign 40 and/or a road marking 42 indicating sign information.

A radio receiver 44 for vehicle-roadside communication is placed on the left side of the dashboard 14 in the vehicle widthwise direction. The radio receiver 44 may be embedded in the car navigation device 16. The radio receiver 44 is configured to receive a signal transmitted from outside the vehicle 10. In the case where a travel course 38 of the vehicle is a highway (including an expressway), multiple radio transmitters 46, such as optical beacons configured to transmit traffic information (including sign information) by means of lights and radio wave beacons configured to transmit traffic information (including sign information) by means of radio waves, are installed along the travel course 38. The radio transmitters 46 are managed by an information manager (not illustrated), and the information manager and the radio transmitters 46 together constitute a sign information provision system. Vehicle Information and Communication System (VICS) (registered trademark) is an example of this kind of system. In the case where the radio transmitters 46 are optical beacons, a signal reception area is several meters in front of and behind a position right under each beacon; on the other hand, in the case where the radio transmitters 46 are radio wave beacons, a signal reception area is several tens of meters in front of and behind a position right under each beacon. The radio receiver 44 receives a signal on traffic information that is transmitted from each radio transmitter 46 in its reception area. Note that, the system may alternatively include a radio receiver 44' that is configured to perform inter-vehicle communication instead of or in addition to vehicle-roadside communication.

An information terminal 48 is a terminal that can take in and out of the vehicle compartment 12 and is connected to the vehicle 10. A smartphone, a tablet terminal, and the like in which a car navigation application software is installed are specific examples of this information terminal. As illustrated in FIG. 2, the information terminal 48 is connected to a server 50 via a public network 52, and is configured to store the latest map information, downloaded from the server 50, in its internal storage device. The information terminal also has a function to measure the travel position of the vehicle 10, and is configured to detect sign information, which is set in association with the travel position of the vehicle 10, from the map information and display it on a screen 48a.

2. First Embodiment

[2-1. Configuration of Sign Information Display System 60]

The configuration of the sign information display system 60 according to the first embodiment is described using FIG. 2. The sign information display system 60 has: a first sign information detector 62; a second sign information detector 64; a travel distance sensor 66; an ECU 70; and a first display 94. The first sign information detector 62 is composed of the camera 36 and the radio receiver 44. The second sign information detector 64 is composed of the car navigation device 16 and the information terminal 48. Note here that the car navigation device 16 and the information terminal 48 also serve as a second display having the screen 16a and the screen 48a. The first display 94 is composed of the HUD 24 and the MID 30. The devices other than the information terminal 48 are a part of the configuration of an in-vehicle network, and they can communicate with one another via a communication line. The information terminal 48 is connected by wire or radio to an interface of the in-vehicle network.

The camera 36 and the radio receiver 44 detect sign information on the traffic sign 40 or the road marking 42, which is located in the area in front of the vehicle 10, from information received from outside the vehicle 10. Specifically, the camera 36 detects the sign information by taking an image of the area in front of the vehicle 10. The radio receiver 44 detects the sign information by receiving a signal transmitted from any of the radio transmitters 46. The car navigation device 16 and the information terminal 48 detect sign information from the map information stored inside them. The camera 36, the radio receiver 44, the car navigation device 16, and the information terminal 48 output signals, including the sign information, to the ECU 70. The travel distance sensor 66 detects the travel distance of the vehicle 10.

The ECU 70 is a control circuit including a microcomputer, and has: a central processing unit (CPU); a ROM (including EEPROM); a random access memory (RAM); input-output devices such as an A/D converter and a D/A converter; and the like. The ECU 70 causes the CPU to load and execute programs recorded in the ROM and thus serves as a various functions implementation unit. In this embodiment, the ECU 70 functions as a recognition unit 72 and an output adjustment unit 82 by executing programs. The ECU 70 also has a timer 92. The ECU 70 may be composed of multiple divided parts, or alternatively may be integrated with another ECU. Note that other hardware can also be used to implement the ECU 70.

The recognition unit 72 is configured to recognize sign information from an input signal. The recognition unit 72 has: an image information recognition unit 74; a radio information recognition unit 76; a navigation information recognition unit 78; and a network information recognition unit 80.

The image information recognition unit 74 is configured to process an image of the area in front of the vehicle 10 taken by the camera 36, and thereby recognize sign information indicated by the traffic sign 40 and the road marking 42. The image information recognition unit 74 is capable of performing publicly-known traffic sign recognition processing such as pattern matching. For example, the image information recognition unit recognizes the sign (traffic sign 40 and road marking 42) in the image of the area in front of the vehicle 10 taken by the camera 36, and removes noise in the recognized image (image of the traffic sign 40 and road marking 42) to recognize a kind of this sign information.

The radio information recognition unit 76 is configured to recognize, in a signal received by the radio receiver 44, sign information and valid zone information indicating a sign information valid zone. The radio transmitters 46 transmit various kinds of traffic information. In this traffic information, the radio information recognition unit 76 recognizes sign information and valid zone information.

The navigation information recognition unit 78 is configured to recognize sign information and valid zone information included in map information around the vehicle 10 detected by the car navigation device 16. Likewise, the network information recognition unit 80 is configured to recognize sign information and valid zone information included in map information around the vehicle 10 detected by the information terminal 48.

The output adjustment unit 82 is configured to make an adjustment to (make a selection among) the sets of sign information recognized by the recognition units 74, 76, 78, and 80, make a selection among the displays 24, 30, 16, and 48, and perform sign information display control (control on whether to display or hide the sign information, etc.). The output adjustment unit 82 has: an anomaly determination unit 84; an valid zone determination unit 86; a display processing unit 88; and a instruction unit 90.

The anomaly determination unit 84 is configured to determine whether or not there is an anomaly in the first sign information detector 62, i.e., both the camera 36 and the radio receiver 44. Any method may be used to determine whether there is an anomaly or not; in this embodiment, the following method is used to determine whether there is an anomaly or not. The camera 36 takes an image of the area in front of the vehicle 10 constantly or for every predetermined period t1, and transmits an image signal (detection signal) to the ECU 70. If not detecting this image signal for a predetermined period t2 (>t1) or more, the anomaly determination unit 84 determines that there is an anomaly in the camera 36. Meanwhile, the radio receiver 44 transmits a signal (detection signal) to the ECU 70 constantly or for every predetermined period t3 irrespective of whether or not there is a signal transmitted from the radio transmitters 46. If not detecting this signal (detection signal) for a predetermined period t4 (>t3) or more, the anomaly determination unit 84 determines that there is an anomaly in the radio receiver 44.

The valid zone determination unit 86 is configured to determine whether or not the vehicle 10 is traveling in the valid zone of sign information detected by the recognition unit 72. For example, the traffic sign 40 installed on the travel course 38 is added with an auxiliary sign indicating the valid zone of this traffic sign 40. The valid zone determination unit 86 determines whether or not the vehicle 10 is traveling in the valid zone of the sign information indicated by the traffic sign 40, based on auxiliary sign information recognized by the image information recognition unit 74. For the traffic sign 40 with no auxiliary sign, the valid zone determination unit determines whether or not the vehicle 10 is traveling in the valid zone of the sign information, based on a given distance beginning at the traffic sign 40 and a travel distance detected by the travel distance sensor 66. In addition, the valid zone determination unit 86 determines whether or not the vehicle 10 is traveling in the valid zone of the sign information, based on valid zone information recognized by the radio information recognition unit 76 and a travel distance detected by the travel distance sensor 66. Further, the valid zone determination unit 86 determines whether or not the vehicle 10 is traveling in the valid zone of the sign information, based on valid zone information recognized by the navigation information recognition unit 78 or the network information recognition unit 80.

The display processing unit 88 is configured to perform display-related processing. Specifically, the display processing unit is configured to select sign information to be displayed and the display to display the sign information. The sign information and the display are selected according to the determination result of the anomaly determination unit 84 and the preset order of priority. If the anomaly determination unit 84 determines that the first sign information detector 62 is normal, the sign information detected by the first sign information detector 62 is selected and the first display 94 is selected. If the anomaly determination unit 84 determines that the first sign information detector 62 is abnormal, the sign information detected by the second sign information detector 64 is selected and the second display (second sign information detector) 64 is selected. Besides, the multiple detectors (radio receiver 44, camera 36, information terminal 48, car navigation device 16) included in the first sign information detector 62 and the second sign information detector 64 are each assigned the order of priority in selection. In this embodiment, the priority is assigned in the order of the radio receiver 44, the camera 36, the information terminal 48, and the car navigation device 16. If sign information of the same kind is detected by the multiple detectors, the sign information of the higher-priority detector is employed. Moreover, the multiple detectors (HUD 24, MID 30, information terminal 48, car navigation device 16) included in the first display 94 and the second display (second sign information detector) 64 are each assigned the order of priority in selection. In this embodiment, the priority is assigned in the order of the HUD 24, the MID 30, the information terminal 48, and the car navigation device 16.

The instruction unit 90 is configured to output an instruction to display sign information to any of the HUD 24, the MID 30, the information terminal 48, and the car navigation device 16, upon receipt of the process result of the display processing unit 88.

Note that, although the radio receiver 44, the camera 36, the information terminal 48, and the car navigation device 16 are provided in this embodiment, not all these detectors necessarily have to be provided. Each of the first sign information detector 62 and the second sign information detector 64 has only to be provided with at least one detector. In addition, although the HUD 24, the MID 30, the information terminal 48, and the car navigation device 16 are provided in this embodiment, not all these displays necessarily have to be provided. Each of the first display 94 and the second display (second sign information detector 64) has only to be provided with at least one display.

[2-2. Sign Information Display Processing]

Hereinbelow, the sign information display processing performed by the sign information display system 60 is described using FIG. 3. A series of processes to be described below may be performed periodically, or alternatively may be performed at a predetermined timing, e.g., at a timing where sign information is detected. Note that, the following description is given on the assumption that maximum speed information is to be displayed as sign information. The maximum speed information is sign information indicating a maximum speed (speed limit) set for the travel course 38.

At Step S1, sign information is detected and recognized. The camera 36 takes an image of the area in front of the vehicle 10 for every predetermined time interval. The image taken by the camera 36 is captured in the image information recognition unit 74. The image information recognition unit 74 performs a series of sign recognition processes. At this time, if this image includes images of the traffic sign 40 and the road marking 42, the image information recognition unit 74 recognizes sets of sign information indicated by all the traffic sign 40 and road marking 42 included in the image. In addition, if the vehicle 10 is located in the reception area for signals transmitted from any of the radio transmitters 46, the radio receiver 44 receives a signal transmitted from the radio transmitter 46. The radio information recognition unit 76 recognizes sign information from the signal received by the radio receiver 44. Further, the car navigation device 16 measures the location of the vehicle 10, and recognizes sign information associated with the location of the vehicle 10 based on the map information stored in the car navigation device 16. The information terminal 48 measures the location of the vehicle 10, and recognizes sign information associated with the location of the vehicle 10 based on the map information stored in the information terminal 48.

At Step S2, it is judged whether the first sign information detector 62 is normal or not. The anomaly determination unit 84 determines that the camera 36 is normal if the camera 36 transmits an image signal to the ECU 70 for every predetermined period t1, and determines that the camera 36 is abnormal if the camera does not transmit an image signal for a predetermined period t2 (>t1) or more. In addition, the anomaly determination unit 84 determines that the radio receiver 44 is normal if the radio receiver 44 transmits a signal to the ECU 70 for every predetermined period t3, and determines that the radio receiver 44 is abnormal if the radio receiver does not transmit a signal for a predetermined period t4 (>t3) or more. These periods are measured by the timer 92. If the anomaly determination unit 84 determines that at least one of the camera 36 and the radio receiver 44 is normal (Step S2: YES), the process proceeds to the process at Step S3 to perform the display process on the first display (see FIG. 4A). On the other hand, if the anomaly determination unit 84 determines that both the camera 36 and the radio receiver 44 are abnormal (Step S2: NO), the process proceeds to the process at Step S4 to perform the display process on the second display (see FIG. 4B).

[2-3. Display Process on First Display]

Figure 4B:
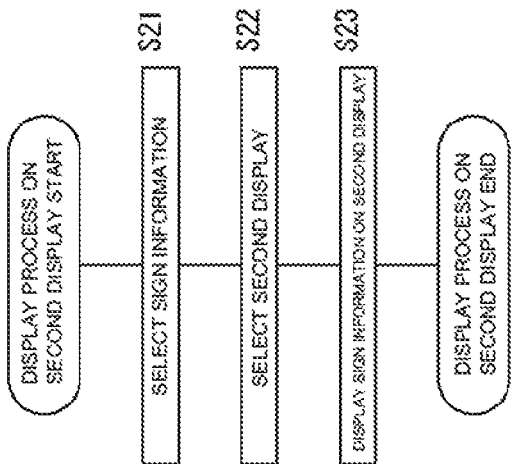
FIG. 4B is a flowchart of a display process on a second display.
Figure 4A:
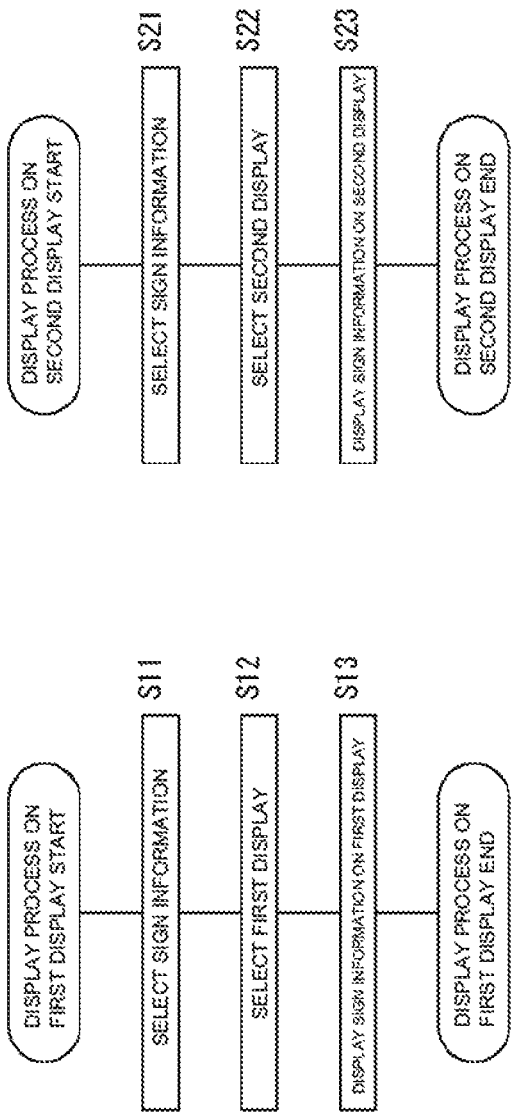
FIG. 4A is a flowchart of a display process on a first display.

The display process on the first display is described using FIG. 4A. At Step S11, sign information is selected. The valid zone determination unit 86 determines whether or not the latest sign information recognized by the image information recognition unit 74 and the latest sign information recognized by the radio information recognition unit 76 are valid. If both sets of sign information are valid, the display processing unit 88 selects higher-priority sign information, i.e., selects the latest sign information recognized by the radio information recognition unit 76 here. If only one of the sets of information is valid, the display processing unit 88 selects the valid sign information.

At Step S12, a selection in the first display 94, i.e., between the HUD 24 and the MID 30 is made. As described previously, in this embodiment, the HUD 24 has a higher priority than the MID 30. Thus, the display processing unit 88 selects the HUD 24. In this respect, when the vehicle 10 has no HUD 24, the display processing unit 88 selects the MID 30.

Figure 5A:
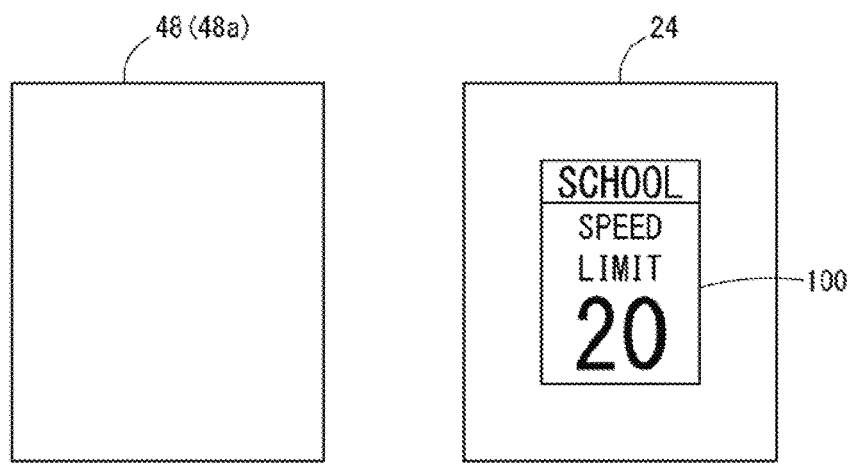
FIG. 5A is an explanatory diagram illustrating a state where sign information is displayed on the first display.

At Step S13, the sign information is displayed on the selected first display 94. The instruction unit 90 outputs a display instruction upon receipt of the process result of the display processing unit 88 at Step S11 and Step S12. Here, the instruction unit 90 outputs, to the HUD 24, an instruction to display the sign information detected by the radio receiver 44. Then, as illustrated in FIG. 5A, the HUD 24 displays thereon an image 100 indicating the sign information (maximum speed information). At this time, no image is displayed on the screen 48a of the information terminal 48 nor on the screen 16a of the car navigation device 16. In addition, no image is displayed on the MID 30 either, although not illustrated here. In this way, the display location for sign information is concentrated at one location (one display). Note that the image 100 illustrated in FIG. 5A shows a sign indicating maximum speed information in the United States.

[2-4. Display Process on Second Display]

The display process on the second display is described using FIG. 4B. At Step S21, sign information is selected. The valid zone determination unit 86 determines whether or not the latest sign information recognized by the navigation information recognition unit 78 and the latest sign information recognized by the network information recognition unit 80 are valid. If both sets of sign information are valid, the display processing unit 88 selects higher-priority sign information, i.e., selects the latest sign information recognized by the network information recognition unit 80 here. If only one of the sets of information is valid, the display processing unit 88 selects the valid sign information. In this respect, when the information terminal 48 is not connected to the in-vehicle network, the display processing unit 88 selects the latest sign information recognized by the navigation information recognition unit 78.

At Step S22, a selection in the second display 64, i.e., between the information terminal 48 and the car navigation device 16 is performed. As described previously, in this embodiment, the information terminal 48 has a higher priority than the car navigation device 16. Thus, the display processing unit 88 selects the information terminal 48. In this respect, when the information terminal 48 is not connected to the in-vehicle network, the display processing unit 88 selects the car navigation device 16.

Figure 5B:
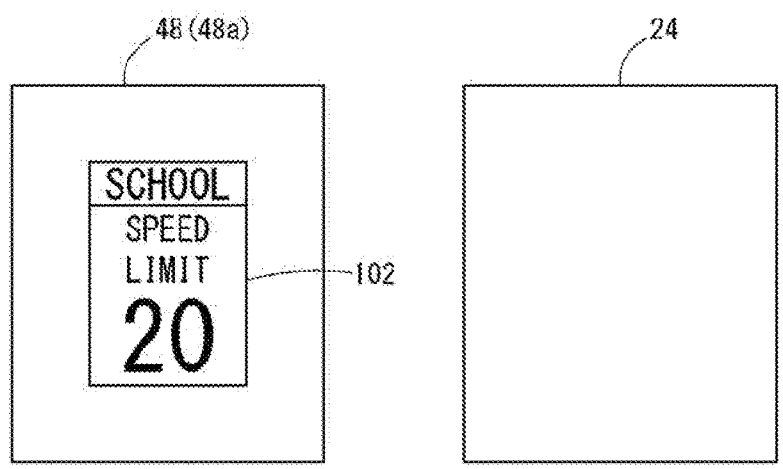
FIG. 5B is an explanatory diagram illustrating a state where sign information is displayed on the second display.

At Step S23, the sign information is displayed on the selected second display. The instruction unit 90 outputs a display instruction upon receipt of the process result of the display processing unit 88 at Step S21 and Step S22. Here, the instruction unit 90 outputs, to the information terminal 48, an instruction to display the sign information detected by the information terminal 48. Then, as illustrated in FIG. 5B, the information terminal 48 displays thereon an image 102 indicating the sign information (maximum speed information). At this time, no image is displayed on the first display 94, i.e., on the HUD 24 nor on the MID 30. In addition, no image is displayed on the screen 16a of the car navigation device 16 either, although not illustrated here. In this way, the display location for sign information is concentrated at one location (one display). Note that the image 102 illustrated in FIG. 5B shows a sign indicating maximum speed information in the United States.

[2-5. Embodiment at Time of Display Switching]

In the case where the sign information display processing illustrated in FIG. 3 is executed repeatedly, the sign information display state is as illustrated in FIG. 5A while there is no anomaly in the camera 36 or the radio receiver 44. Once an anomaly occurs in the camera 36 and the radio receiver 44, the sign information display state is switched from the state illustrated in FIG. 5A to the state illustrated in FIG. 5B. In other words, the display for displaying sign information is switched from the first display 94 to the second display (second sign information detector) 64. At this time, the switching of the mode of the sign information from the display mode to the hidden mode at the first display 94 and the switching of the mode of the sign information from the hidden mode to the display mode at the second display (second sign information detector) 64 may be carried out at the same timing. Alternatively, switching control as illustrated in FIG. 6 may be performed.

Figure 6:
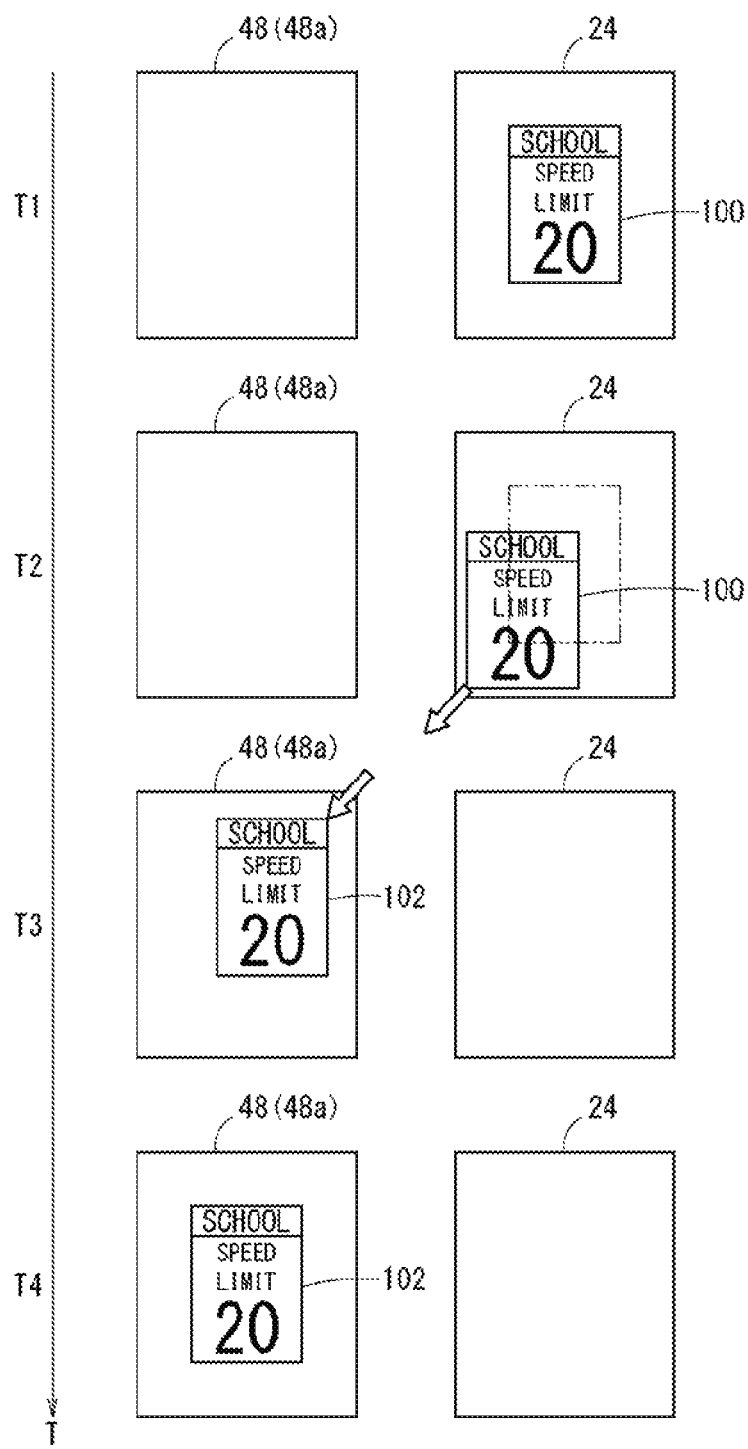
FIG. 6 is an explanatory diagram illustrating a video at the time of display switching.

At Time T1 illustrated in FIG. 6, there is no anomaly in the camera 36 or the radio receiver 44. For example, if there is no anomaly in the radio receiver 44, the display processing unit 88 makes a selection such that it displays, on the HUD 24, the sign information recognized by the radio information recognition unit 76 (Step S11 and Step S12 in FIG. 4A). The instruction unit 90 outputs a display instruction to the HUD 24 in accordance with the process performed by the display processing unit 88. In accordance with this display instruction, the HUD 24 displays thereon the image 100 indicating the sign information (maximum speed information) detected by the radio receiver 44 (Step S13 in FIG. 4A).

If an anomaly occurs in the camera 36 and the radio receiver 44 at Time T2, the display processing unit 88 makes a selection such that it displays, on the information terminal 48, the sign information recognized by the network information recognition unit 80 (Step S21 and Step S22 in FIG. 4B). At this time, the display processing unit 88 performs video control on the image 100 displayed on the HUD 24. The instruction unit 90 outputs a video instruction to the HUD 24 in accordance with the process performed by the display processing unit 88. In accordance with this video instruction, the HUD 24 displays thereon a video in which the image 100 moves toward the information terminal 48 (toward the location where the information terminal 48 is disposed).

At Time T3 after Time T2, e.g., at a time when the image 102 disappears from the HUD 24, the display processing unit 88 performs video control on the information terminal 48. The instruction unit 90 outputs a video instruction to the information terminal 48 in accordance with the process performed by the display processing unit 88. In accordance with this video instruction, the information terminal 48 displays, on the screen 48a, a video in which the image 102 moves from the location of the HUD 24 (from the location where the HUD 24 is disposed).

At Time T4 when the image 102 reaches a predetermined position in the screen 48a, the display processing unit 88 stops the video control on the image 102 and performs regular display control. The instruction unit 90 outputs a display instruction to the information terminal 48 in accordance with the process performed by the display processing unit 88. In accordance with this display instruction, the information terminal 48 displays, at the predetermined position in the screen 48a, the image 102 indicating the sign information (maximum speed information) detected by the information terminal 48 (Step S23 in FIG. 4B).

[2-6. Summary of First Embodiment]

The sign information display system 60 according to the first embodiment includes: the first sign information detector 62 that is configured to detect sign information on the traffic sign 40 or the road marking 42, which is located in the area in front of the vehicle 10, from information received from outside the vehicle 10; the second sign information detector 64 that is configured to detect sign information from information stored inside the vehicle 10; the first display 94 that is configured to display thereon the sign information detected by the first sign information detector 62; the second display 64 (the second sign information detector 64 which is hereinafter not described) that is configured to display thereon the sign information detected by the second sign information detector 64; and the control circuit 70 that is configured to control the first display 94 and the second display 64. If the first sign information detector 62 is normal, the first display 94 displays the sign information detected by the first sign information detector 62, in accordance with the instruction from the control circuit 70. At this time, the second display 64 hides the sign information in accordance with the instruction from the control circuit 70. On the other hand, if the first sign information detector 62 is abnormal, the first display 94 hides the sign information in accordance with the instruction from the control circuit 70. At this time, the second display 64 displays the sign information detected by the second sign information detector 64, in accordance with the instruction from the control circuit 70.

A sign information display method according to the first embodiment is performed using: the first sign information detector 62 that is configured to detect sign information on the traffic sign 40 or the road marking 42, which is located in the area in front of the vehicle 10, from information received from outside the vehicle 10; the second sign information detector 64 that is configured to detect sign information from information stored inside the vehicle 10; the first display 94 that is configured to display thereon the sign information detected by the first sign information detector 62; and the second display 64 (the second sign information detector 64 which is hereinafter not described) that is configured to display thereon the sign information detected by the second sign information detector 64. If the first sign information detector 62 is normal (FIG. 3: Step S2: YES), the first display 94 displays the sign information detected by the first sign information detector 62 (Step S3). At this time, the second display 64 hides the sign information. On the other hand, if the first sign information detector 62 is abnormal (Step S2: NO), the first display 94 hides the sign information. At this time, the second display 64 displays the sign information detected by the second sign information detector 64 (Step S4).

In the first embodiment, since the first display 94 displays the sign information detected by the first sign information detector 62 and the second display 64 hides the sign information when the first sign information detector 62 is normal, it is possible to prevent a hunting phenomenon in which display of the sign information detected by the first sign information detector 62 and display of the sign information detected by the second sign information detector 64 are switched from each other in a short period of time, and thereby reduce a sense of discomfort that the driver feels.

In addition, in the first embodiment, since the first display 94 hides the sign information and the second display 64 displays the sign information detected by the second sign information detector 64 when the first sign information detector 62 is abnormal, it is possible to keep displaying the sign information in the vehicle compartment 12. Further, since the second display 64 displays the sign information when the first sign information detector 62 is abnormal, the driver can recognize an anomaly/failure of the first sign information detector 62.

In the first embodiment, the first sign information detector 62 includes: the camera 36 (imaging and detection device) that is configured to take an image of the area in front of the vehicle 10 and detect sign information; and the radio receiver 44 (communication detector) that is configured to receive signals transmitted from the radio transmitters 46 (information transmission device) installed outside the vehicle 10 and detect sign information. The sign information display system 60 includes the anomaly determination unit 84 (determination device) that is configured to determine whether the first sign information detector 62 is normal or abnormal. The anomaly determination unit 84 determines that the first sign information detector 62 is normal if detecting a detection signal that is output from the first sign information detector 62 irrespective of whether there is sign information or not, and determines that the first sign information detector 62 is abnormal if not detecting the detection signal.

In the first embodiment, since the anomaly determination unit 84 determines that the first sign information detector 62 is normal and causes the second display to hide the sign information detected by the second sign information detector 64 when it detects the detection signal output from the first sign information detector 62, it is possible to prevent a hunting phenomenon in which display of the sign information detected by the first sign information detector 62 and display of the sign information detected by the second sign information detector 64 are switched from each other in a short period of time, and thereby reduce a sense of discomfort that the driver feels.

In the first embodiment, when switching the mode of the sign information from the display mode to the hidden mode, the HUD 24 (first display 94) hides the image 100, indicating the sign information, after displaying a video such that the image 100 moves toward the location where the information terminal 48 (second display 64) is disposed (Time T1 to Time T3 in FIG. 6).

The first embodiment allows the driver to easily recognize visually where the sign information is to be displayed next when the HUD 24 (first display 94) switches the mode of the sign information from the display mode to the hidden mode. Thereby, a sense of discomfort that the driver feels can be reduced.

In the first embodiment, when switching the mode of the sign information from the hidden mode to the display mode, the information terminal 48 (second display 64) displays the image 102, indicating the sign information, after displaying a video such that the image 102 moves from the location where the HUD 24 (first display 94) is disposed.

The first embodiment allows the driver to easily visually recognize that the sign information has shifted from the HUD 24 (first display 94) when the information terminal 48 (second display 64) switches the mode of the sign information from the hidden mode to the display mode. Thereby, a sense of discomfort that the driver feels can be reduced.

3. Second Embodiment

[3-1. Configuration of Sign Information Display System 110]

Figure 7:
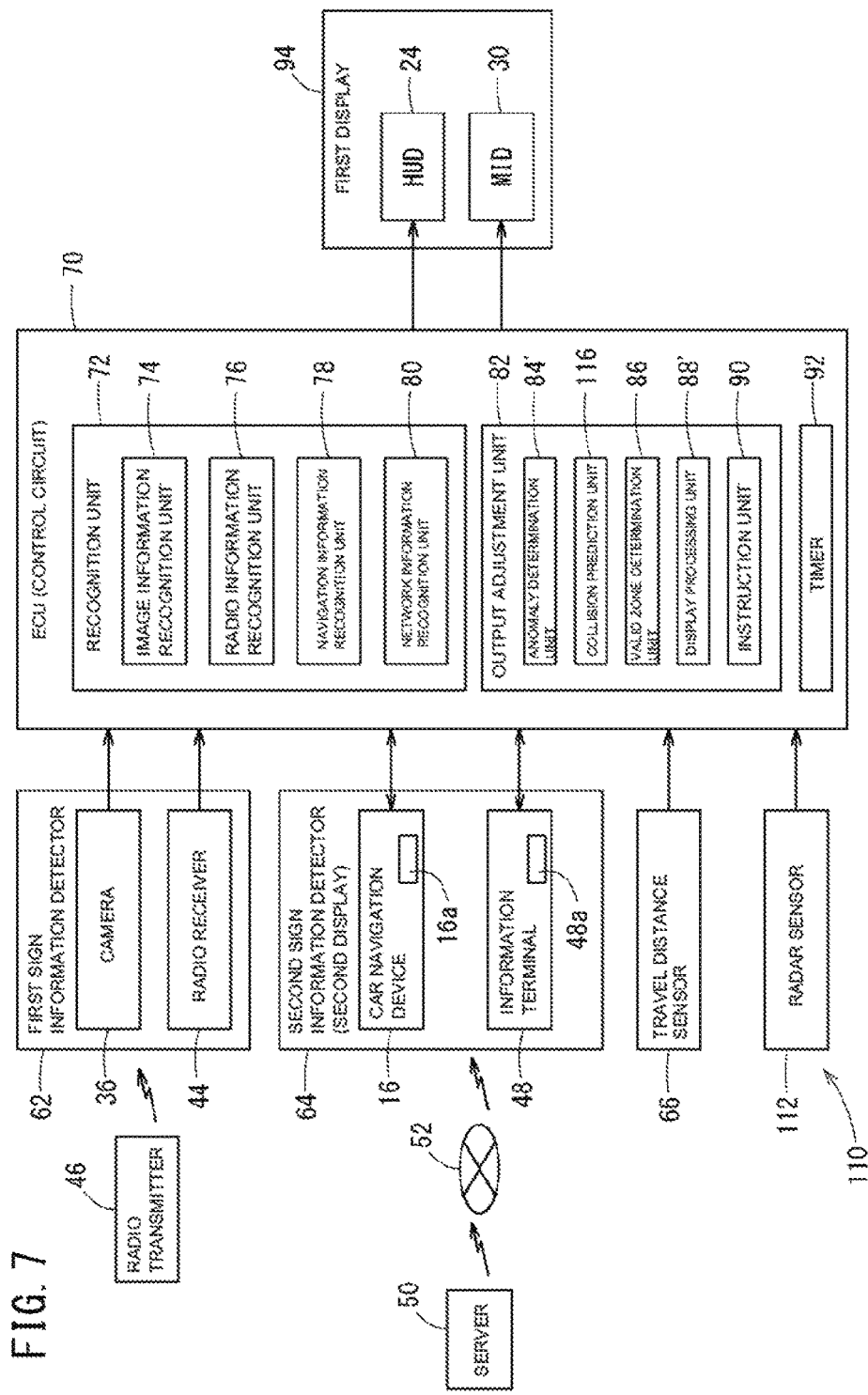
FIG. 7 is a block diagram of a sign information display system according to a second embodiment.

The configuration of a sign information display system 110 according to a second embodiment is described using FIG. 7. The sign information display system 110 is achieved by adding some functions to the sign information display system 60 of the first embodiment. Constituents in the configuration of the sign information display system 110 that are the same as those in the configuration of the sign information display system 60 of the first embodiment are assigned the same reference numerals and are not described here.

In the second embodiment, information having a higher priority for display than sign information (such information is hereinafter referred to as priority information) is displayed on the first display 94, and the sign information having been displayed on the first display 94 is displayed on the second display (second sign information detector) 64. The priority information can be set as appropriate. In the second embodiment, the priority information includes: warning information indicating a possible danger where the vehicle 10 might hit a peripheral object from behind; and failure information indicating that a device mounted in the vehicle 10 is not working.

A radar sensor 112 is configured to detect an object in the area in front of the vehicle and detect the distance between the vehicle and the object. The radar sensor 112 is placed facing the front in a front portion of the vehicle 10, e.g. inside a front grille. Various radars (such as a millimeter wave radar, a microwave radar, and a laser radar) can be employed as the radar sensor 112. It is also possible to employ a fusion sensor that combines information achieved from the camera 36 and information achieved from the radar sensor 112. Besides, it is also possible to install another radar sensor facing an area at the side of or behind the vehicle 10, in order to detect an object in the area at the side of or behind the vehicle 10. The radar sensor 112 outputs, to the ECU 70, a signal including information on the distance between the vehicle and the detected object.

The output adjustment unit 82 of the ECU 70 further has a collision prediction unit 116. The collision prediction unit 116 is configured to predict a possibility of rear-end collision of the vehicle 10 with the peripheral object. Any method may be employed to predict the possibility of rear-end collision; in this embodiment, the collision prediction unit 116 predicts that there is a possibility of rear-end collision if time allowance to collision (TTC) falls below a threshold. TTC is calculated based on the detection result of the radar sensor 112. The collision prediction unit 116 corresponds to a priority information detector.

As is the case with the anomaly determination unit 84 of the first embodiment, an anomaly determination unit 84' is configured to determine whether or not there are anomalies in both the camera 36 and the radio receiver 44. The anomaly determination unit 84' may be further configured to determine whether or not there is an anomaly in another device. For example, a trouble code (DTC) is output in the case of a failure in a device connected to the in-vehicle network. The anomaly determination unit 84' may be configured to determine whether there is a trouble code or not. As is the case with the collision prediction unit 116, the anomaly determination unit 84' also corresponds to the priority information detector.

As is the case with the display processing unit 88 of the first embodiment, a display processing unit 88' is configured to perform display-related processing. The display processing unit 88' is further configured to perform processing of displaying priority information on the first display 94.

[3-2. Sign Information Display Processing]

Hereinbelow, the processing performed by the sign information display system 110 is described using FIG. 8. A series of processes to be described below may be performed periodically, or alternatively may be performed at a predetermined timing, e.g., at a timing where sign information is detected. Note that, the following description is given on the assumption that maximum speed information is to be displayed as sign information.

Figure 8:
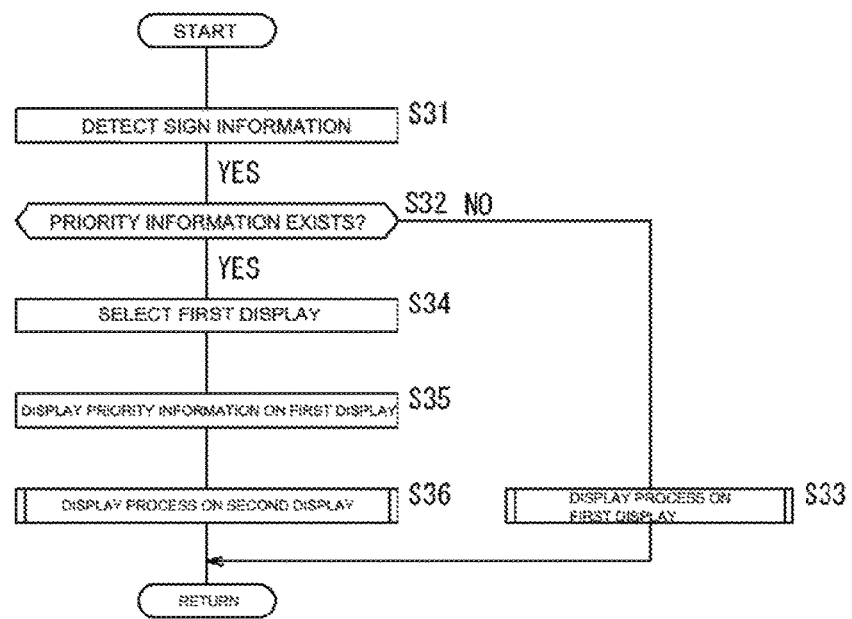
FIG. 8 is a flowchart of the sign information display system according to the second embodiment.

Out of the series of processes illustrated in FIG. 8, the processes at Step S31, Step S33, and Step S36 respectively coincide with the processes at Step S1, Step S3, and Step S4 (see FIG. 3) that are performed in the first embodiment. Thus, the processes that coincide with the processes performed in the first embodiment are not described in detail.

Sign information is detected at Step S31, and then it is determined whether there is priority information or not at Step S32. A determination as to whether there is priority information or not is made based on the determination result of the anomaly determination unit 84'. As is the case with Step S2 illustrated in FIG. 3, the anomaly determination unit 84' determines whether or not the camera 36 and the radio receiver 44 are normal. If the camera 36 and/or the radio receiver 44 are normal, that is, if there is no priority information (Step S32: NO), the process proceeds to the process at Step S33. On the other hand, if both the camera 36 and the radio receiver 44 are abnormal, that is, if there is priority information (Step 32: YES), the process proceeds to the process at Step S34.

In addition, a determination as to whether there is priority information or not is made also based on the prediction result of the collision prediction unit 116. The collision prediction unit 116 predicts the possibility of rear-end collision based on the detection result of the radar sensor 112. If there is no possibility of rear-end collision, that is, if there is no priority information (Step S32: NOI), the process proceeds to the process at Step S33. On the other hand, if there is a possibility of rear-end collision, that is, if there is priority information (Step S32: YES), the process proceeds to the process at Step S34.

At Step S33, the display process on the first display described using FIG. 4A is performed.

At Step S34, a selection in the first display 94, i.e., between the HUD 24 and the MID 30 is made. In the second embodiment, the HUD 24 has a higher priority than the MID 30 as in the first embodiment. Thus, the display processing unit 88' selects the HUD 24. In this respect, when the vehicle 10 has no HUD 24, the display processing unit 88' selects the MID 30.

Figure 9:
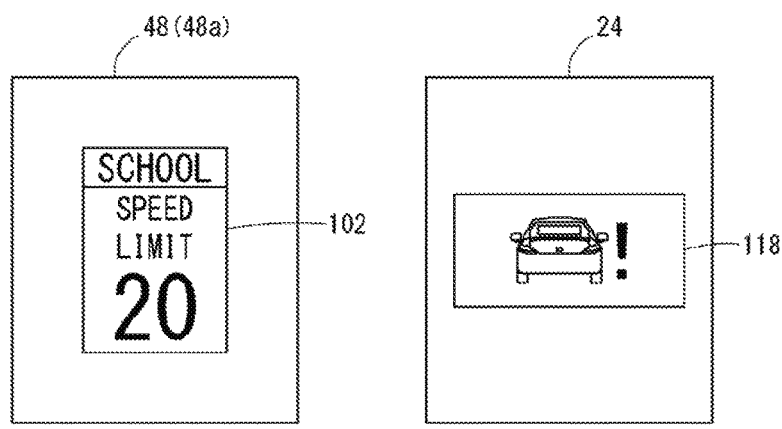
FIG. 9 is an explanatory diagram illustrating a state where priority information is displayed on a first display and sign information is displayed on a second display.

At Step 35, the priority information is displayed on the selected first display 94. The instruction unit 90 outputs a display instruction upon receipt of the process result of the display processing unit 88' at Step S34. Here, the instruction unit 90 outputs an instruction to display the priority information to the HUD 24. Then, as illustrated in FIG. 9, the HUD 24 displays thereon an image 118 indicating the priority information.

The process at Step S36 is performed after the process at Step S35, or at the same time as the process at Step S35. At Step S36, the display process on the second display described using FIG. 4B is performed. By this process, as illustrated in FIG. 9, the information terminal 48 being the second display 64 displays, on the screen 48a, an image 102 indicating the sign information detected by the information terminal 48.

As described above, according to the second embodiment, the priority information indicating a warning or the like is displayed on the HUD 24 being the first display 94, and the sign information is displayed on the information terminal 48 being the second display (second sign information detector) 64. In this respect, at the time of switching information displayed on the HUD 24 from the sign information to the priority information and displaying the sign information on the information terminal 48, it is also possible to display the video of the images 100 and 102 indicating the sign information on the HUD 24 and the information terminal 48 as described using FIG. 6.

[3-3. Summary of Second Embodiment]

The sign information display system 110 according to the second embodiment includes the anomaly determination unit 84' and the collision prediction unit 116 (priority information detector) that are configured to detect priority information having a higher priority for display than the maximum speed information. If the maximum speed information is detected by the first sign information detector 62 and no priority information is detected by the anomaly determination unit 84' or the collision prediction unit 116, the first display 94 displays the maximum speed information in accordance with the instruction from the ECU 70, and the second display 64 hides the maximum speed information in accordance with the instruction from the ECU 70. On the other hand, if the priority information is detected by the anomaly determination unit 84' or the collision prediction unit 116, the first display 94 hides the maximum speed information and displays the priority information in accordance with the instruction from the ECU 70, and the second display 64 displays the maximum speed information in accordance with the instruction from the ECU 70.

In the second embodiment, since the first display 84 displays the priority information having a higher priority, it is possible to notify the driver of the priority information in a clearly understandable way. At this time, since the second display 64 displays the maximum speed information, it is possible to provide the driver with necessary information.

4. Third Embodiment

[4-1. Sign Information Display System 120]

A sign information display system 120 according to a third embodiment is described using FIG. 10. The sign information display system 120 is achieved by changing the processing performed in the sign information display system 60 of the first embodiment. Constituents in the configuration of the sign information display system 120 that are the same as those in the configuration of the sign information display system 60 of the first embodiment are assigned the same reference numerals and are not described here.

In the third embodiment, sign information is displayed on a display 94' irrespective of whether or not there is an anomaly in the first sign information detector 62. Specifically, if there is no anomaly in either the radio receiver 44 or the camera 36, the sign information detected by the radio receiver 44 is displayed on the HUD 24 as in the first embodiment. If there is an anomaly in the radio receiver 44 but no anomaly in the camera 36, the sign information detected by the camera 36 is displayed on the HUD 24 as in the first embodiment. On the other hand, if there are anomalies in both the radio receiver 44 and the camera 36, the sign information detected by the information terminal 48 is displayed on the HUD 24. Further, if there are anomalies in both the radio receiver 44 and the camera 36 and there is no information terminal 48 in the vehicle compartment 12, the sign information detected by the car navigation device 16 is displayed on the HUD 24. In this respect, when the vehicle 10 has no HUD 24, the sign information is displayed on the MID 30.

[4-2. Summary of Third Embodiment]

The sign information display system 120 according to the third embodiment includes: the first sign information detector 62 that is configured to detect sign information on the traffic sign 40 or the road marking 42, which is located in the area in front of the vehicle 10, from information received from outside the vehicle 10; the second sign information detector 64 that is configured to detect sign information from information stored inside the vehicle 10; the display 94' that is configured to display thereon the sign information; and the ECU 70 (control circuit) that is configured to control the display 94'. If the first sign information detector 62 is normal, the display 94' displays the sign information detected by the first sign information detector 62, in accordance with the instruction from the ECU 70. On the other hand, if the first sign information detector 62 is abnormal, the display 94' displays the sign information detected by the second sign information detector 64, in accordance with the instruction from the ECU 70.

According to the third embodiment, the display 94' always displays the sign information at the same location irrespective of a change in the source of detection of the sign information. This enables the driver to visually identify the displayed sign more easily.

5. Other Embodiments

In the first to third embodiments, the priority of the HUD 24 is set higher than the priority of the MID 30; however, these embodiments may be configured so that sign information is displayed on the MID 30 when the HUD 24 is off due to the driver's intention or failure or when the HUD 24 is not mounted in the vehicle 10.

The second embodiment may be configured so that the sign information is displayed on the MID 30 when the priority information is displayed on the HUD 24. Alternatively, the second embodiment may be configured so that the HUD 24 and the MID 30 are assigned the same priority, and that the priority information is displayed on any one of or both the HUD 24 and the MID 30 and the sign information is displayed on the information terminal 48.

DESCRIPTION OF REFERENCE NUMERALS

10 VEHICLE
16 CAR NAVIGATION DEVICE
24 HEAD UP DISPLAY (HUD)
30 MULTI INFORMATION DISPLAY (MID)
36 CAMERA
38 TRAVEL COURSE
40 TRAFFIC SIGN
42 ROAD MARKING
44 RADIO RECEIVER
46 RADIO TRANSMITTER
60, 110, 120 SIGN INFORMATION DISPLAY SYSTEM
62 FIRST SIGN INFORMATION DETECTOR
64 SECOND SIGN INFORMATION DETECTOR
70 ECU
72 RECOGNITION UNIT
74 IMAGE INFORMATION RECOGNITION UNIT
76 RADIO INFORMATION RECOGNITION UNIT
78 NAVIGATION INFORMATION RECOGNITION UNIT
80 NETWORK INFORMATION RECOGNITION UNIT
84, 84' ANOMALY DETERMINATION UNIT
88, 88' DISPLAY PROCESSING UNIT
90 INSTRUCTION UNIT
94 FIRST DISPLAY
94' DISPLAY
112 RADAR SENSOR
116 COLLISION PREDICTION UNIT

The invention claimed is:

1. A sign information display system comprising:
a first sign information detector that is configured to receive from an outside of a vehicle first sign information of a traffic sign existing on a road or on a road marking in front of the vehicle and to detect the traffic sign from the first sign information received from the outside of said vehicle, said first sign information detector comprising at least one of:
an imaging device that is configured to capture an image of an area in front of said vehicle to detect said first sign information from the image; and
a communication detector that is configured to receive a signal transmitted from an information transmission device installed outside said vehicle to detect said second sign information from the signal;
a second sign information detector that is configured to detect second sign information corresponding to said traffic sign from information stored inside said vehicle;
a first display that is configured to display thereon said first sign information detected by said first sign information detector;
a second display that is configured to display thereon said second sign information detected by said second sign information detector; and
a control circuit that is configured to control said first display and said second display and comprises a determination device to determine whether or not said first sign information detector is normal or abnormal, said determination device being configured to,
detect a detection signal that is output from said first sign information detector at a predetermined timing and determine that said first sign information detector is normal as long as said detection signal from said first sign information detector is detected at the predetermined timing irrespective of whether said sign information is detected or not, and
determine that said first sign information detector is abnormal if said detection signal is not detected at the predetermined timing, wherein
if it is determined by said determination device that said first sign information detector is normal, said first display is controlled to display said first sign information detected by said first sign information detector and said second display is controlled not to display said second sign information, and
if it is determined by said determination device that said first sign information detector is abnormal, said first display is controlled not to display said first sign information and said second display is controlled to display said second sign information detected by said second sign information detector.

2. The sign information display system according to claim 1, wherein
said first sign information detector or said second sign information detector is configured to detect information of a maximum speed limit on the road on which the vehicle is traveling,
said control circuit further comprises a priority information detector that is configured to detect priority information having a higher priority for display than said maximum speed limit information,
if said maximum speed limit information is detected by said first sign information detector and said priority information is not detected by said priority information detector,
said first display is controlled to display said maximum speed limit information, and
said second display is controlled not to display said maximum speed limit information, and
if said priority information is detected by said priority information detector,
said first display is controlled not to display said maximum speed limit information and to display said priority information, and
said second display is controlled to display said maximum speed limit information.

3. The sign information display system according to claim 1, wherein, when it is determined that said first sign information detector is normal said first display is controlled to switch from a display mode in which said first display displays said first sign information to a non-display mode in which said first display does not display said first sign information, and
when the first display is switched from the display mode to the non-display mode said first display first displays a video such that an image of said traffic sign moves toward a location of said second display and then delete the image.

4. The sign information display system according to claim 1, wherein, when it is determined that said first sign information detector is not normal said second display is controlled to switch from a non-display mode in which said second display does not display said second sign information to a display mode in which said second display displays said second sign information, and
when the second display is switched from the non-display mode to the display mode said second display first displays a video such that an image of said traffic sign moves from a location of said first display and then display the image on said second display.

5. A sign information display system comprising:
a first sign information detector that is configured to receive from an outside of a vehicle first sign information of a traffic sign existing on a road or on a road marking in front of the vehicle and to detect the traffic sign from the first sign information received from the outside of said vehicle, said first sign information detector comprising at least one of:
an imaging device that is configured to capture an image of an area in front of said vehicle to detect said first sign information from the image; and
a communication detector that is configured to receive a signal transmitted from an information transmission device installed outside said vehicle to detect said second sign information from the signal;
a second sign information detector that is configured to detect second sign information corresponding to the traffic sign from information stored inside said vehicle;
a display that is configured to display thereon said first or second sign information; and
a control circuit that is configured to control said display and comprises a determination device to determine whether said first sign information detector is normal or abnormal, said determination device being configured to,
detect a detection signal that is output from said first sign information detector at a predetermined timing and determine that said first sign information detector is normal as long as said detection signal from said first sign information detector is detected at the predetermined timing irrespective of whether said sign information is detected or not, and determine that said first sign information detector is abnormal if said detection signal is not detected at the predetermined timing, wherein if it is determined by said determination device that said first sign information detector is normal, said display is controlled to display said first sign information detected by said first sign information detector, and if it is determined by said determination device that said first sign information detector is abnormal, said display is controlled to display said second sign information detected by said second sign information detector.

6. A sign information display method comprising:

a first sign information detection step of, by utilizing a first sign information detector, performing at least one of the steps of: (i) receiving from an outside of a vehicle first sign information of a traffic sign existing on a road or on a road marking in front of the vehicle by capturing an image of an area in front of said vehicle to detect said first sign information from the image; and (ii) detecting the traffic sign from said first sign information received from the outside of said vehicle by receiving a signal transmitted from an information transmission device installed outside said vehicle to detect said second sign information from the signal;

a second sign information detection step of detecting second sign information corresponding to the traffic sign from information stored inside said vehicle;

a first display step of displaying said first sign information detected by said first sign information detector; and a second display step of displaying said second sign information detected by said second sign information detection step, wherein the method further comprises the steps of:

determining whether said first sign information detector is normal or abnormal by detecting a detection signal that is output from said first sign information detector at a predetermined timing and determining that said first sign information detector is normal as long as said detection signal from said first sign information detector is detected at the predetermined timing irrespective of whether said sign information is detected or not;

displaying said first sign information detected by said first sign information detector and hiding said second sign information if it is determined that said first sign information detector is normal; and hiding said first sign information and displaying said second sign information detected by said second sign information step if it is determined that said first sign information detector is abnormal.

\* \* \* \* \*